Oct. 31, 1939.  A. L. TAYLOR  2,177,792
SOIL FUMIGANT APPLICATOR
Filed March 3, 1939  2 Sheets-Sheet 1
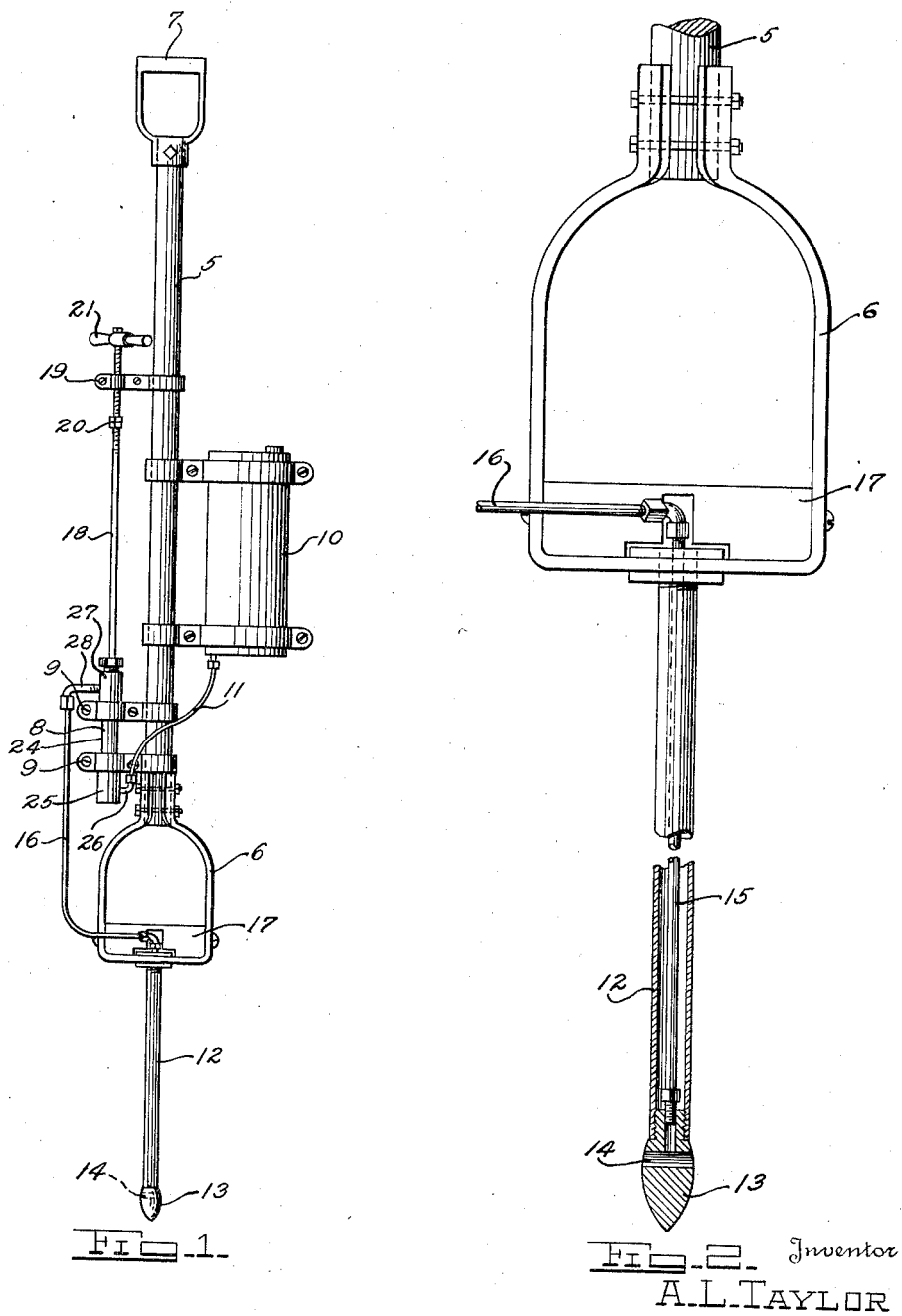
Inventor
A. L. TAYLOR Oct. 31, 1939.     A. L. TAYLOR     2,177,792
SOIL FUMIGANT APPLICATOR
Filed March 3, 1939     2 Sheets-Sheet 2
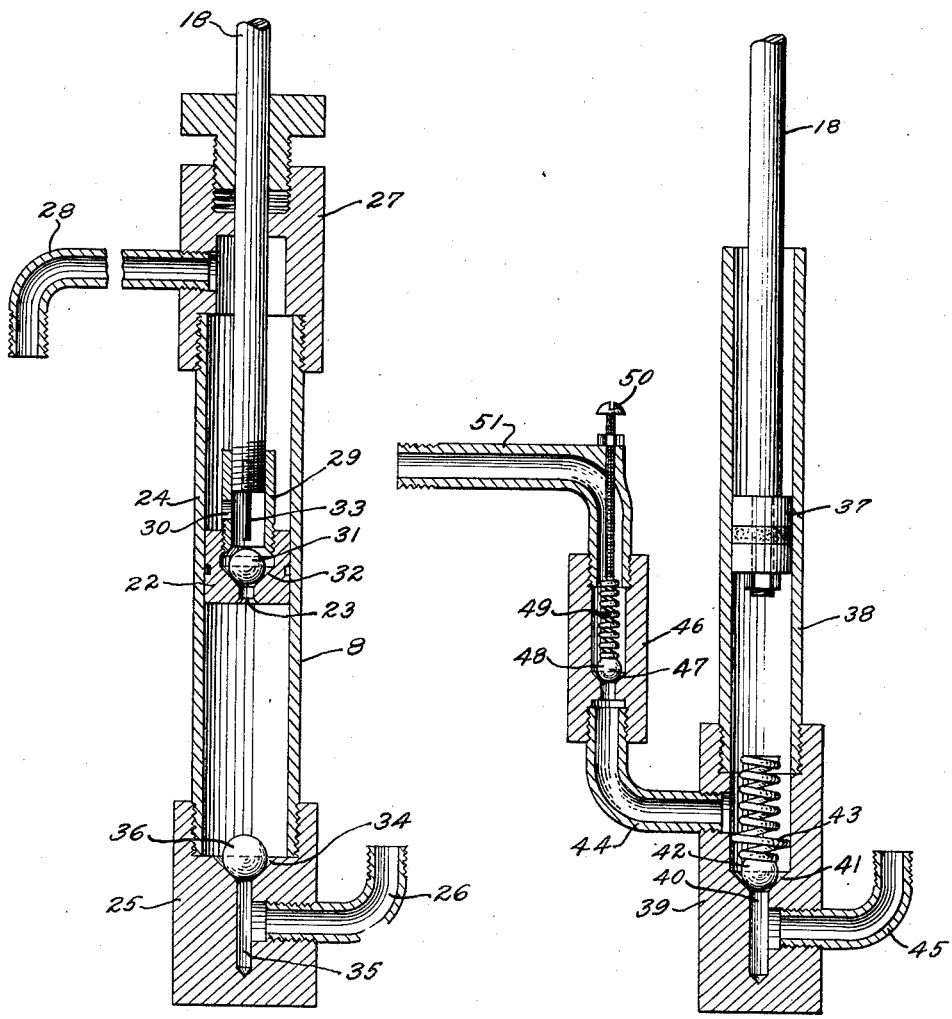
Inventor
A. L. TAYLOR Patented Oct. 31, 1939

2,177,792

UNITED STATES PATENT OFFICE 2,177,792

SOIL FUMIGANT APPLICATOR

Albert L. Taylor, Tifton, Ga.; dedicated to the free use of the People in the territory of the United States Application March 3, 1939, Serial No. 259,634

1 Claim. (Cl. 47—49)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to a soil fumigant applicator and more particularly to a soil fumigant applicator adapted for use in applying liquid soil fumigants beneath the soil surface in combating the root-knot nematode and other nematode or insect pests as well as fungi and bacteria living in the soil.

The pests mentioned above live in the soil, often more than a foot beneath the surface. Consequently, they cannot be reached by any simple method now available. Fumigants can be applied to the soil only by makeshift methods or by removing it to a chamber constructed for the purpose.

The object of this invention is to make available simple and efficient equipment through the use of which accurately measured amounts of liquid soil fumigants can be placed beneath the soil surface in order that the nematodes, insects or other organisms therein may be killed. The invention is also adapted to other uses than soil fumigation, such as the fumigation of manure or compost and can be used with other liquids than fumigants, such as liquid fertilizers or root stimulating solutions which might be advantageously placed in close proximity to the roots of growing plants.

One advantage of this invention is that the soil fumigants can be placed beneath the soil surface in close proximity to the organisms to be killed, thereby greatly increasing the efficiency of the fumigant and consequently reducing the quantity required.

Another advantage is that the amounts of fumigant applied can be accurately predetermined, thus reducing waste of the material due to the use of too large a quantity and reducing inefficiency due to the use of too small a quantity.

Still another advantage is that the measurement of the fumigant is accomplished in a very simple manner, thereby reducing inaccuracies due to inattention on the part of the operator.

A further advantage is that the soil can be treated in the field or greenhouse where it is to be used, eliminating the necessity of moving it to a special fumigating chamber.

A still further advantage is that any liquid can be used in this invention, so that by selection of the proper liquid, nematodes, insects, fungi or bacteria can be controlled or liquid fertilizers can be supplied to the roots of growing plants.

Yet another advantage is that, due to the fact that the only openings in the system containing the liquid are a very small one for admitting air to the supply tank and a discharge opening which is beneath the soil surface when liquid is being discharged, disagreeable liquids, such as carbon bisulphide or irritating liquids, such as chlorpicrin, can be handled with safety and comfort to the operator.

The following description considered together with the accompanying drawings will more fully disclose this invention, its constructions, arrangements, and operations of parts and further objects and advantages thereof will be apparent.

In the drawings:

Figure 1 is a front elevational view of an embodiment of this invention.

Figure 2 is an enlarged fragmentary view of the lower portion of Figure 1, partly in section.

Figure 3 is a longitudinal section of the pump hereinafter designated by the numeral 8.

Figure 4 is a longitudinal section of an alternative type of pump which may be substituted for the one shown in Figure 3.

Referring with more particularity to Figures 1, 2, and 3, the numeral 5 designates a vertical rod at the bottom of which is attached a stirrup 6 and at the top of which a handle 7 is secured. A manually operated pump 8, the details of which are hereinafter more fully described, is secured to the number 5 above the stirrup 6 by means of brackets 9, or any other suitable means. A reservoir or tank 10 is also bracketed to the member 5 above the brackets 9, substantially as shown. The outlet of the tank 10 is connected to the intake of the pump 8 by means of a flexible tube 11.

To the lower end of the stirrup 6, a hollow tube or spike 12 is secured. The bottom of the spike 12 carries a perforated point 13, said point having outlets 14 communicating with a vertical tube 15 disposed longitudinally in the spike 12, substantially as shown. The tube 15 projects up through the upper end of the spike to a short distance in the stirrup 6 where it is connected to the delivery side of the pump 8 by means of a flexible tube 16. A block 17, secured between the sides of the stirrup in the lower end thereof, provides a bearing for the operator's foot and, at the same time, protects the tubes 15 and 16 from injury.

The piston rod 18 of the pump 8 is threaded at its upper portion, and is slidably held by a bracket 19. The threaded portion of said piston rod is fitted with a threaded abutter or nut 20 adapted to adjustably abut the bottom of the bracket 19. The upper end of the rod 18 carries a handle 21 to facilitate its translation.

Referring with more particularity to Figure 3, which is a longitudinal section of the pump 8, a movable piston 22, having a central bore 23, is disposed within the cylindrical barrel 24. The lower end of the barrel 24 is closed by the endpiece 25, which endpiece carries the intake tubular fitting 26 communicating with the inside of the barrel 24 through a central bore 35, substantially as shown. The upper end of the barrel 24 is closed by a member 27, through which the piston rod 18 slidably operates, and carries the delivery tubular fitting 28 communicating with the inside of barrel 24. The piston 22 is secured to the lower end of the piston rod 18 through a short tube 29 communicating with the bore 23, which tube is provided with a port 30. The bore 23 of the piston 22 carries a valve ball 31 and a valve seat 32 therefor. A pin 33 is secured to the lower end of the rod 18 projecting to a point above the ball 31 so that when said ball is forced upward, it will abut the end of said pin 33 without going upward any further and thus prevents blocking of the passage of the fluid. Consequently, the fluid being pumped can enter through the bore 23 around the ball 31 and out through the port 30 into the barrel 29 from whence it is forced through the delivery tube 28. The endpiece 25 is also provided with a valve comprising a valve seat 34 in the top of the central bore 35, and a valve ball 36 normally resting on said valve seat 34.

In the alternative type of pump illustrated in Figure 4, the piston 37 is connected directly to the end of the piston rod 18 in the barrel 38. The lower end of the barrel 38 is closed by endpiece 39 having a partial central bore 40, the upper portion of which is enlarged to form a valve seat 41 for the valve ball 42 on top of which a coil spring 43 is disposed. The tubular outlet elbow fitting 44 of the pump is tapped through the side of the endpiece 39 above the valve seat 41, and the tubular inlet fitting 45 is tapped through said endpiece 39 below the valve seat 41, substantially as shown. The vertical arm of the fitting 44 carries the outlet valve box 46, which valve box contains a valve seat 47 and valve ball 48 normally resting thereon and held in place by means of a coil spring 49 disposed between said valve ball 48 and a set screw 50 mounted through the horizontal arm of the elbow 51 fitted in the top of the valve box 46, substantially as shown.

The operation of this invention is as follows: The nut 20 is elevationally adjusted on the threaded portion of the rod 18 so that one stroke of the piston will cause the pump 8 to deliver the desired amount of liquid. The tank 10 is then filled with the liquid to be used. The operator then places the point 13 at the place in the soil to be treated. By putting his foot in the stirrup 6 and pressing downward on the block 17, point 13 is forced in the ground to the desired depth up to the stirrup. The pump handle 21 is then moved up until nut 20 contacts the bottom of the bracket 19. The pump handle is then pushed down as far as it will go. This has the effect of forcing the predetermined amount of fluid through the outlets 14 below the ground. The device is then lifted out of the ground and transferred to the next point of application where the same process is repeated.

Using the pump shown in Figure 3, the upstroke of the piston 22 forces the liquid contained in the section of the pump above the piston through the outlet 27. At the same time a partial vacuum is created in the pump barrel 24 below the piston causing the ball 36 to become unseated as a result of the greater pressure of the liquid beneath, which liquid enters and fills this portion of the pump barrel below the piston. As piston 22 starts its down-stroke, the valve ball 36 drops back to its seat by gravity and the liquid is forced through the bore 23, lifting the valve ball 31 from its seat. The pin 33 prevents the valve ball 31 from lifting too far to block passage of the liquid and the liquid passes through the port 30 and then through the delivery fitting 28, as above described. When the piston 22 reaches the bottom of the pump barrel 24, it comes in contact with the valve ball 36, forcing it against its seat so that, when the pump is not operating, hydrostatic pressure from the supply tank 10, combined with the siphon action of the delivery fitting 28, will not raise the two valve balls 31 and 36 from their respective seats to permit liquid to run freely through the pump.

Using the pump shown in detail in Figure 4, the upstroke of the piston 37 creates a partial vacuum in the barrel 38 which is immediately filled with liquid through the inlet 39 in the same manner as described hereinbefore in reference to the pump shown in Figure 3, except that in this alternative type the pressure of the liquid entering must lift the spring 43 as well as the valve ball 42. As the piston starts its downward stroke the valve ball 42 drops back on its seat 41 while the hydraulic pressure lifts the valve ball 48 from its seat 47 against the action of the spring 49 and the liquid flows through the fitting 44, through the bore in the valve box 46 and out through the elbow 51. As the piston 37 reaches the end of its down-stroke, it contacts the spring 43 forcing the valve ball 42 against its seat 41 providing a positive stop of flow from the supply tank 10, thus preventing leakage due to hydraulic pressure and siphon action as above described in connection with Figure 3.

The following dimensions are recommended but are not deemed indispensable for this device: An overall length of about four feet. The spike 12 should be about one foot long. The stirrup 6 should be about six inches wide by eight inches in length and the rod 5 should be about two feet long. The supply tank 10 should have a capacity of about two quarts and the pump should be so dimensioned that it will deliver from one-third to one liquid ounce per stroke. The pump design shown in Figure 4 is best suited for the delivery of from two to ten cc. per stroke, while the type shown in Figure 3 is suitable for devices intended to deliver larger amounts, although either of these two pumps can be so dimensioned to serve any capacity.

Having thus described my invention, I claim:

In a sub-soil fluid injector the combination with a frame member, a stirrup secured to said frame member, a pointed hollow spike secured to said stirrup having perforations near its point; of a fluid pump comprising a tubular barrel, a piston slidably disposed in said barrel, said piston having a longitudinal bore therethrough, a ball valve seat within said bore, a ball normally disposed on said seat, a tubublar member having a port through the side thereof secured to said piston above said ball, a piston rod secured to the top of said tubular member, a pin in said tubular member projecting from the end of said piston rod to within a short distance above said ball when normally seated, an endpiece at the lower end of said barrel, another ball valve seat in the top portion of said endpiece, another ball normally disposed on said last-mentioned valve seat adapted to contact said piston when said piston is in its extreme low position, a tubular inlet below said last-mentioned valve seat and a tubular outlet at the top of said barrel.

ALBERT L. TAYLOR.